United States Patent
Suzuki et al.

(10) Patent No.: US 10,471,959 B2
(45) Date of Patent: Nov. 12, 2019

(54) VEHICLE CONTROL DEVICE

(71) Applicants: DENSO CORPORATION, Kariya, Aichi-pref. (JP); SOKEN, INC., Nishio, Aichi-pref. (JP)

(72) Inventors: Youichirou Suzuki, Nishio (JP); Akira Takaoka, Nishio (JP); Masashi Mori, Kariya (JP); Takatoshi Sekizawa, Kariya (JP)

(73) Assignees: DENSO CORPORATION, Kariya, Aichi-pref. (JP); SOKEN, INC., Nishio, Aichi-pref. (JP)

( * ) Notice: Subject to any disclaimer, the term of this patent is extended or adjusted under 35 U.S.C. 154(b) by 231 days.

(21) Appl. No.: 15/531,582

(22) PCT Filed: Dec. 8, 2015

(86) PCT No.: PCT/JP2015/006103
§ 371 (c)(1),
(2) Date: May 30, 2017

(87) PCT Pub. No.: WO2016/092824
PCT Pub. Date: Jun. 16, 2016

(65) Prior Publication Data
US 2018/0118209 A1    May 3, 2018

(30) Foreign Application Priority Data

Dec. 12, 2014  (JP) .................................. 2014-251943

(51) Int. Cl.
*B60W 30/16* (2012.01)
*B60C 19/00* (2006.01)
(Continued)

(52) U.S. Cl.
CPC ............. *B60W 30/16* (2013.01); *B60C 19/00* (2013.01); *B60C 99/00* (2013.01); *B60T 7/22* (2013.01);
(Continued)

(58) Field of Classification Search
CPC ............. B60W 30/16; B60W 2710/18; B60W 2710/0605; B60W 2550/308;
(Continued)

(56) References Cited

U.S. PATENT DOCUMENTS 6,163,747 A * 12/2000 Matsuno ................. B60T 8/172
303/146
2005/0085987 A1 * 4/2005 Yokota ................ B60C 23/0477
701/80
2009/0093938 A1   4/2009 Isaji et al.

FOREIGN PATENT DOCUMENTS

JP  H04054600 A  2/1992
JP  2002002472 A  1/2002
(Continued)

*Primary Examiner* — Muhammad Shafi
(74) *Attorney, Agent, or Firm* — Harness, Dickey & Pierce, P.L.C.

(57) ABSTRACT

A vehicle control device including a tire-side device and a vehicle-side device is provided. The tire-side device includes a vibration detection unit that outputs a detection signal corresponding to a magnitude of vibration of a tire, a signal processing unit that generates μ data representing a friction coefficient between the tire and a road surface by processing the detection signal, and a transmitter that transmits the μ data. The vehicle-side device includes a receiver that receives the μ data and a travel control unit that estimates the friction coefficient based on the μ data, acquires a braking distance of the vehicle based on the friction coefficient, and controls acceleration and deceleration of the vehicle based on the braking distance.

3 Claims, 6 Drawing Sheets

(51) Int. Cl.
| | | |
|---|---|---|
| *B60W 40/12* | (2012.01) | |
| *B60W 40/13* | (2012.01) | |
| *B60T 8/172* | (2006.01) | |
| *B60W 30/14* | (2006.01) | |
| *B60W 40/068* | (2012.01) | |
| *B60T 8/173* | (2006.01) | |
| *B60T 7/22* | (2006.01) | |
| *B60T 8/17* | (2006.01) | |
| *B60C 99/00* | (2006.01) | |

(52) U.S. Cl.
CPC ............... *B60T 8/17* (2013.01); *B60T 8/172* (2013.01); *B60T 8/173* (2013.01); *B60T 8/1725* (2013.01); *B60W 30/14* (2013.01); *B60W 30/143* (2013.01); *B60W 40/068* (2013.01); *B60W 40/12* (2013.01); *B60W 40/13* (2013.01); *B60C 2019/004* (2013.01); *B60T 2201/024* (2013.01); *B60T 2210/12* (2013.01); *B60W 2400/00* (2013.01); *B60W 2520/10* (2013.01); *B60W 2530/20* (2013.01); *B60W 2550/148* (2013.01); *B60W 2550/308* (2013.01); *B60W 2710/0605* (2013.01); *B60W 2710/18* (2013.01); *B60W 2720/106* (2013.01)

(58) Field of Classification Search
CPC ........... B60W 2530/20; B60W 30/143; B60W 40/13; B60W 40/12; B60W 40/068; B60W 30/14; B60W 2550/148; B60W 2520/10; B60W 2400/00; B60W 2720/106; B60T 8/17; B60T 7/22; B60T 8/173; B60T 8/1725; B60T 8/172; B60T 2201/024; B60T 2210/12; B60C 2019/004; B60C 19/00
USPC .......................................................... 701/96
See application file for complete search history.

(56) References Cited

FOREIGN PATENT DOCUMENTS

| | | | |
|---|---|---|---|
| JP | 2002067843 A | | 3/2002 |
| JP | 2002087032 A | | 3/2002 |
| JP | 2002-67843 | * | 8/2002 |
| JP | 2004359203 A | | 12/2004 |
| JP | 2005063398 A | | 3/2005 |
| JP | 2005205956 A | | 8/2005 |
| JP | 2005306160 A | | 11/2005 |
| JP | 2006-131136 A | | 5/2006 |
| JP | 2008-239590 | * | 9/2008 |
| JP | 2009262899 A | | 11/2009 |

* cited by examiner

VEHICLE CONTROL DEVICE

CROSS REFERENCE TO RELATED APPLICATIONS

This application is a U.S. National Phase Application under 35 U.S.C. 371 of International Application No. PCT/JP2015/006103 filed on Dec. 8, 2015 and published in Japanese as WO 2016/092824 A1 on Jun. 16, 2016. This application is based on and claims the benefit of priority from Japanese Patent Application No. 2014-251943 filed on Dec. 12, 2014. The entire disclosures of all of the above applications are incorporated herein by reference.

TECHNICAL FIELD

This disclosure relates to a vehicle control device that controls acceleration and deceleration of a vehicle so as to avoid collision with a preceding vehicle.

BACKGROUND ART

Adaptive cruise control (hereinafter referred to as "ACC") and collision mitigation brake systems (for example, a pre-crash safety system (PCS: registered trademark)) are known which control acceleration and deceleration of a vehicle to avoid a collision with a preceding vehicle. In ACC, acceleration and deceleration of a vehicle are controlled by adjusting the distance between the vehicle and a preceding vehicle based on the traveling speed of the vehicle so as to avoid a collision with the preceding vehicle (see, for example, Patent Literature 1). A collision mitigation brake system compares the distance between a vehicle and an obstacle, for example, a preceding vehicle with the braking distance of the vehicle and warns the driver of the vehicle or, by generating a braking force, controls acceleration and deceleration of the vehicle so as to avoid a collision between the vehicle and the obstacle.

PRIOR ART LITERATURES

Patent Literature

Patent Literature 1: JP2009-262899A

SUMMARY OF INVENTION

The above ACC and collision mitigation brake system control acceleration and deceleration of a vehicle on the assumption that the friction coefficient $\mu$ between each tire of the vehicle and the road surface, i.e. grip force, is high (e.g. $\mu=0.8$).

However, when the friction coefficient $\mu$ between each tire and the road surface is low, for example, when a vehicle is traveling on a low-$\mu$ road with a low road surface $\mu$ like a snow-covered road or a frozen road or when the tire is worn, the grip force decreases and the braking distance of the vehicle increases. The braking distance of the vehicle can increase also when the tire pressure is low and when the ground contact load of each tire wheel of the vehicle is excessively large. In such cases, it may not be possible to appropriately control acceleration and deceleration of the vehicle based on the assumption that the friction coefficient $\mu$ between each tire of the vehicle and the road surface is high. For example, it may not be possible to maintain an appropriate inter-vehicle distance using an ACC system or a collision mitigation brake system.

In view of the foregoing, an object of the present disclosure is to provide a vehicle control device capable of more appropriately control acceleration and deceleration of a vehicle taking into account variation of the friction coefficient $\mu$ between each tire and the road surface.

A vehicle control device in an aspect of the present disclosure comprises a tire-side device including: a vibration detection unit that is attached to a back side of a tread of a tire fitted to a tire wheel mounted on a vehicle and that outputs a detection signal corresponding to a magnitude of vibration of the tire; a signal processing unit that generates $\mu$ data by processing the detection signal outputted from the vibration detection unit, the $\mu$ data representing a friction coefficient between the tire and a road surface; and a transmitter that transmits the $\mu$ data, and, the vehicle control device further comprises a vehicle-side device including: a receiver that receives the $\mu$ data transmitted from the transmitter; and a travel control unit including a friction coefficient estimation unit that estimates the friction coefficient based on the $\mu$ data, a braking distance estimation unit that acquires a braking distance of the vehicle based on the friction coefficient, and an acceleration deceleration control unit that controls acceleration and deceleration of the vehicle based on the braking distance.

As described, the friction coefficient between each tire and the road surface is communicated from the tire-side device to the vehicle-side device and acceleration and deceleration of the vehicle are controlled based on the friction coefficient. To be specific, a braking distance is estimated based on the friction coefficient $\mu$ and, based on the braking distance, acceleration and deceleration of the vehicle are controlled. Hence, it is possible to adjust timing of vehicle acceleration and deceleration according to the braking distance estimated based on the friction coefficient.

BRIEF DESCRIPTION OF DRAWINGS

The above and other objects, features and advantages of the present disclosure will become more apparent from the following detailed description made with reference to the attached drawings. In the drawings.

EMBODIMENTS FOR CARRYING OUT INVENTION

Embodiments of the present disclosure will be described below based on drawings. In the following description, parts identical or equivalent to each other between embodiments will be denoted by mutually identical reference symbols.

First Embodiment

Referring to FIGS. 1 to 5, a vehicle control device 100 of the present embodiment will be described. The vehicle control device 100 of the present embodiment is used to estimate the surface condition of a road on which a vehicle is traveling based on the vibration of the contact area of the tire fitted on each tire wheel of the vehicle and to control acceleration deceleration of the vehicle based on the estimation results.

Figure 1A:
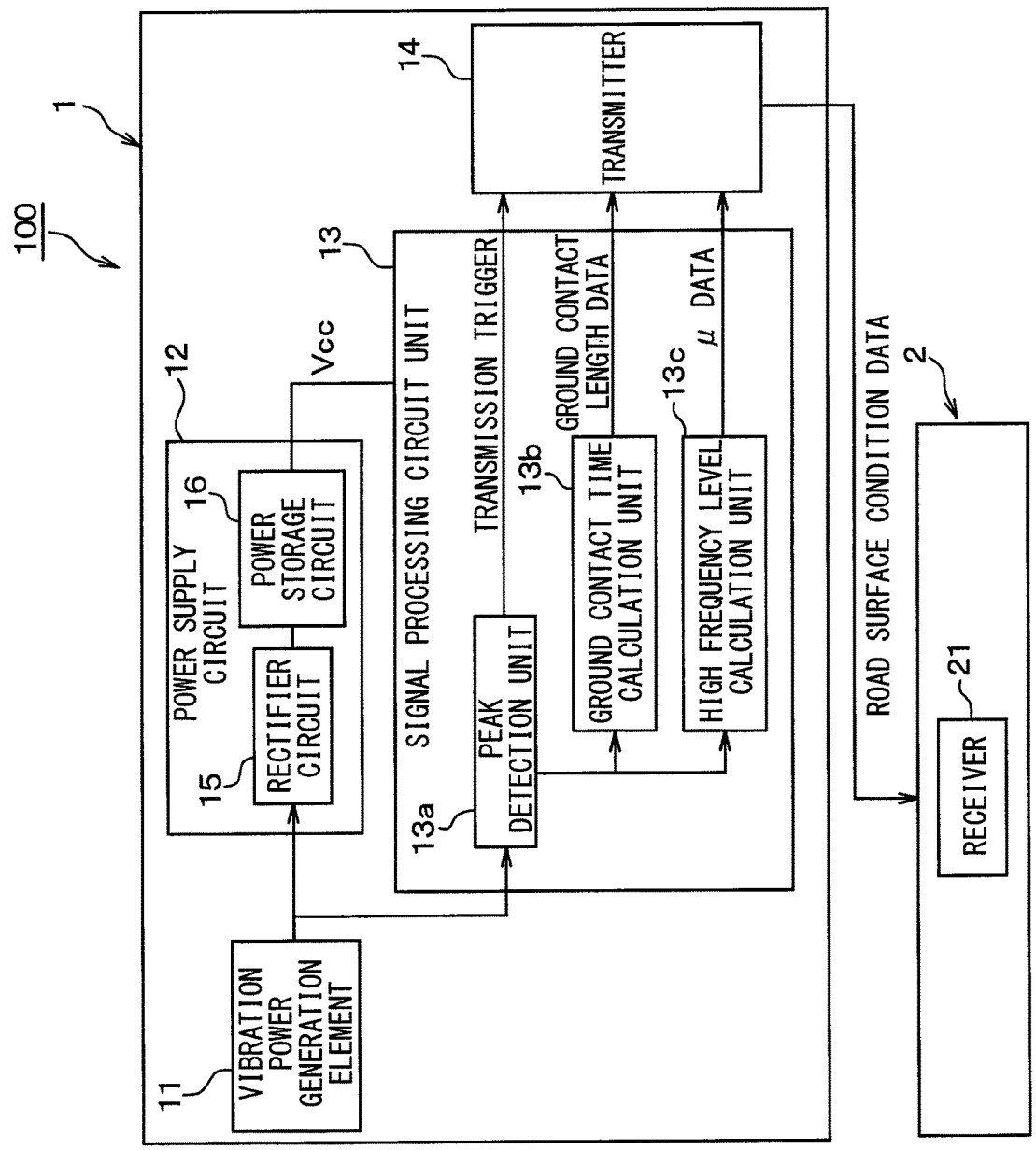
FIG. 1A is a diagram illustrating a block configuration of a tire-side device of a vehicle control device according to a first embodiment.
Figure 1B:
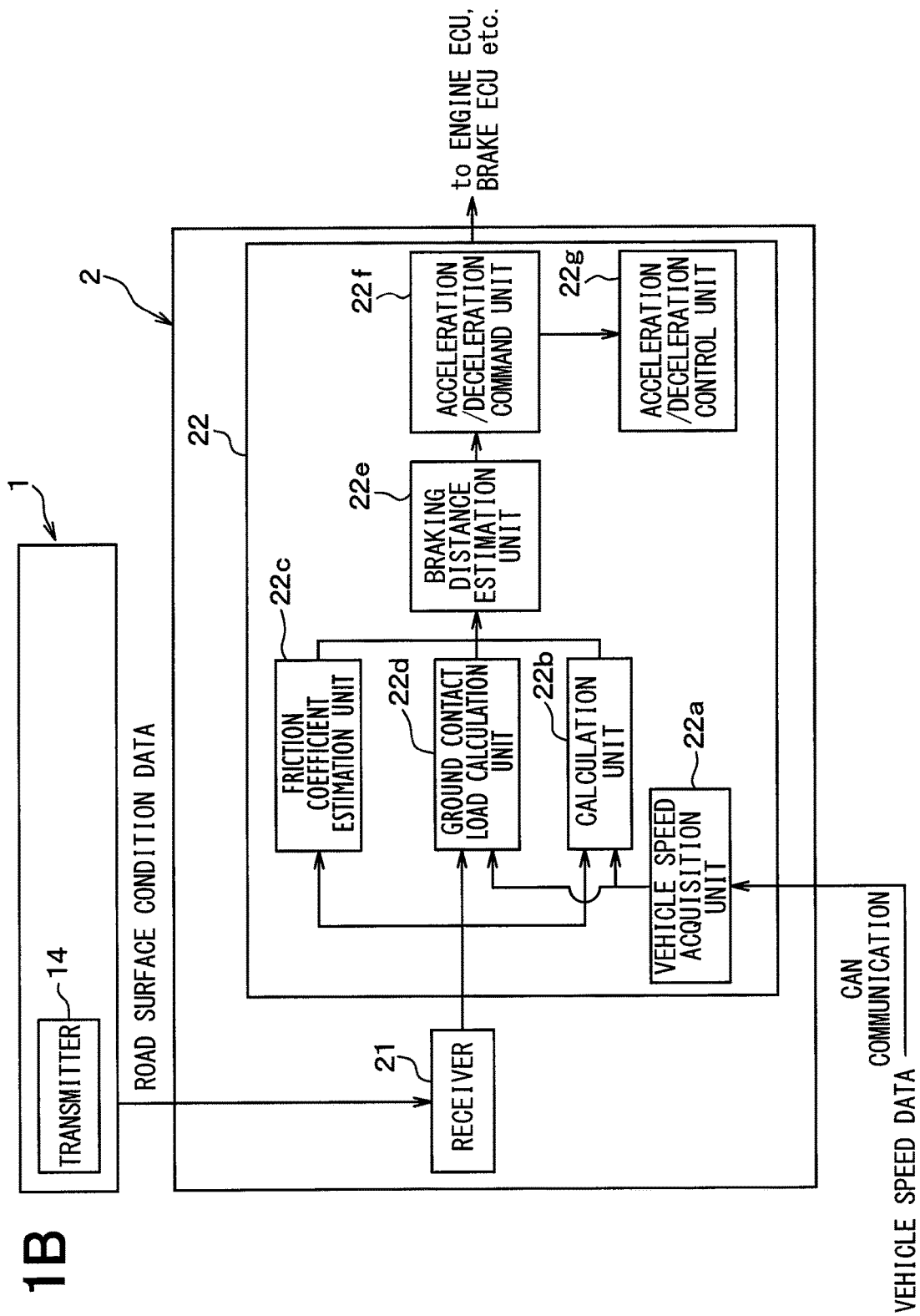
FIG. 1B is a diagram illustrating a block configuration of a vehicle-side device of the vehicle control device according to the first embodiment.

As shown in FIGS. 1A and 1B, the vehicle control device 100 is configured including a tire-side device 1 provided on the tire side and a vehicle-side device 2 provided on the vehicle body side. The vehicle control device 100 transmits, from the tire-side device 1, data (hereinafter referred to as "μ data") representing friction coefficient μ between the tire and the road surface on which the vehicle is traveling and data (hereinafter referred to as "ground contact length data") about the ground contact time corresponding to the ground contact length of the tire. The vehicle control device 100 receives, at the vehicle-side device 2, the μ data and ground contact length data transmitted from the tire-side device 1 and estimates the friction coefficient μ and ground contact length based on the received data, while also estimating a braking distance. Based on the estimated braking distance, the vehicle control device 100 controls acceleration and deceleration of the vehicle. To be specific, the tire-side device 1 and the vehicle-side device 2 are configured as follows.

Figure 2:
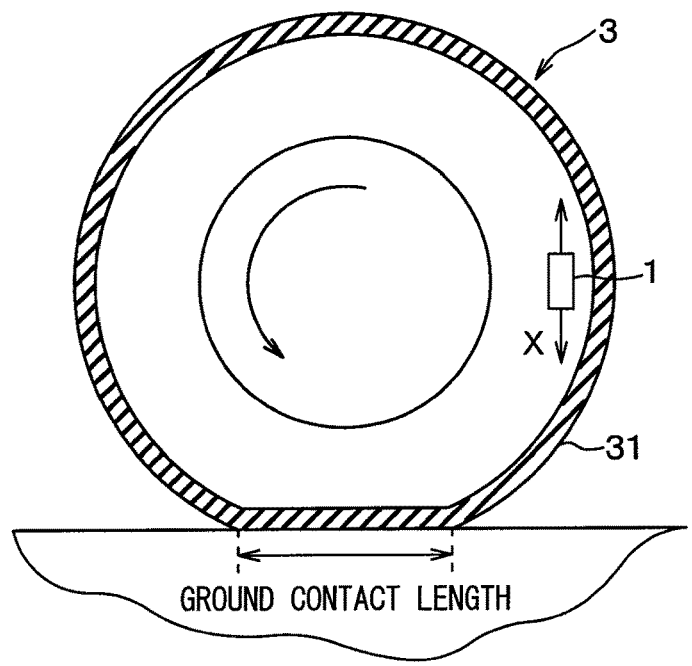
FIG. 2 is a sectional schematic diagram of a tire mounted with the tire-side device.

The tire-side device 1 is configured including, as shown in FIG. 1A, an oscillation power generation element 11, a power supply circuit 12, a signal processing circuit unit 13 and a transmitter 14 and is provided, as shown in FIG. 2, on the back side of a tread 31 of the tire 3.

The vibration power generation element 11 constitutes a vibration detection unit which outputs a detection signal corresponding to the vibration of the tire 3 in a direction tangential to the circular orbit drawn by the tire-side device 1 in the rotation of the tire 3, i.e. a tire tangential direction (the direction of arrow X in FIG. 2). In the present embodiment, while outputting the detection signal corresponding to the vibration of the tire 3 in the tire tangential direction, the vibration power generation element 11 transforms the vibration energy into an electrical energy and thereby generates power supply for the tire-side device 1. Hence the vibration power generation element 11 is so disposed as to generate power corresponding to the vibration of the tire 3 in the tire tangential direction. The vibration power generation element 11 may be formed of, for example, an electrostatic induction power generation element (electret), a piezoelectric element, a friction element, a magnetostrictive element, or an electromagnetic induction element. When the element is only for outputting a detection signal corresponding to the tire vibration in the tire tangential direction without any regard to power generation, a different element, for example, an acceleration sensor may be employed.

In cases where an electrostatic induction power generation element is used as the vibration power generation element 11, when an upper electrode positively charged by electrostatic induction with respect to a negatively charged lower electrode is horizontally vibrated, the electric charges generated by electrostatic induction vary to generate electromotive force and, as a result, power is generated. Based on power generation by the vibration power generation element 11, power supply for the tire-side device 1 is generated and a detection signal corresponding to the magnitude of vibration in the tire tangential direction is generated.

When a vehicle equipped with the vehicle control device 100 travels, the tread 31 of the tire 3 is vibrated due to various factors, for example, rotational movement of the tire 3 and road surface unevenness. The vibration is transferred to the vibration power generation element 11 causing the vibration power generation element 11 to generate power and the power generated is transferred to the power supply circuit 12 allowing the power supply circuit 12 to supply power to the tire-side device 1. The voltage outputted by the vibration power generation element 11 engaged in power generation varies according to the magnitude of the vibration, so that the output voltage is transferred to the signal processing circuit unit 13 as a detection signal representing the magnitude of the tire vibration in the tire tangential direction. The output voltage of the vibration power generation element 11 generated with the upper electrode moving reciprocatingly due to vibration is an AC voltage.

The power supply circuit 12 provides power supply by storing electricity based on the output voltage of the vibration power generation element 11 and supplies power to the signal processing circuit unit 13 and the transmitter 14. The power supply circuit 12 is configured including a rectifier circuit 15 and a power storage circuit 16.

The rectifier circuit 15 is a publicly known circuit and converts the AC voltage outputted from the vibration power generation element 11 into a DC voltage. The AC voltage outputted from the vibration power generation element 11 is converted into a DC voltage at the rectifier circuit 15 and is then outputted to the power storage circuit 16. The rectifier circuit 15 may be either a full-wave rectifier circuit or a half-wave rectifier circuit.

The power storage circuit 16 is configured including a capacitor and stores the DC voltage applied from the rectifier circuit 15. The output voltage of the vibration power generation element 11 is stored, via the rectifier circuit 15, in the power storage circuit 16 and the voltage stored is used as power supply for the signal processing circuit unit 13 and the transmitter 14 included in the tire-side device 1. The power supply circuit 12 having the power storage circuit 16 can store excess power when generated by the vibration power generation element 11 and can compensate for power shortage when the power generation is insufficient.

The signal processing circuit unit 13 corresponds to the signal processing unit. The signal processing circuit unit 13 obtains data representing road surface condition by using and processing the output voltage of the vibration power generation element 11 as a detection signal which contains data representing the vibration in the tire tangential direction and transfers the road surface condition data to the transmitter 14. Namely, based on the temporal output voltage variation of the vibration power generation element 11, the signal processing circuit unit 13 extracts ground contact duration of the vibration power generation element 11 (i.e. the duration of ground contact of a portion of the tread 31 of the tire 3 corresponding to the location where the vibration power generation element 11 is disposed) during rotation of the tire 3. The high-frequency components of the detection signal detected during the ground contact duration of the vibration power generation element 11 represent the road surface condition. Therefore, the signal processing circuit unit 13 extracting the high-frequency components of the detection signal generates data representing the road surface condition from the extracted high-frequency components and sends the road surface condition data to the transmitter 14. Similarly, based on the temporal output voltage variation of the vibration power generation element 11, the signal processing circuit unit 13 calculates the ground contact time during rotation of the tire 3 of the vibration power generation element 11. The ground contact time of the vibration power generation element 11 can be used as data about the ground contact length of the ground contact surface of the tire 3, so that the data representing the ground contact time is sent to the transmitter 14.

To be specific, the signal processing circuit unit 13 is configured with a well-known microcomputer having, for example, a CPU, a ROM, a RAM and an I/O and performs the above processing in accordance with programs stored, for example, in the ROM. The signal processing circuit unit 13 includes, as function parts to perform the processing, a peak detection unit 13a, a ground contact time calculation unit 13b and a high-frequency level calculation unit 13c.

Figure 3:
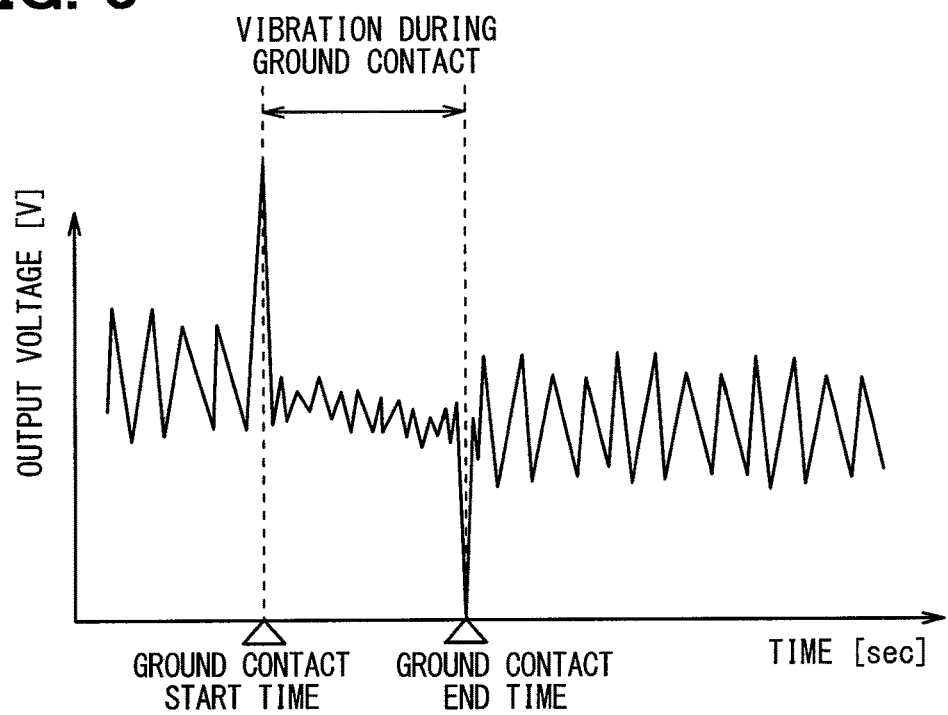
FIG. 3 is a diagram illustrating an output voltage waveform of a vibration power generation element during tire rotation.

The peak detection unit 13a detects the peak value of the detection signal represented by the output voltage of the vibration power generation element 11. FIG. 3 illustrates an example waveform of the output voltage of the vibration power generation element 11 during tire rotation. As shown in FIG. 3, when, with the tire 3 rotating, the portion of the tread 31 corresponding to the location where the vibration power generation element 11 is disposed starts contact with the ground, the output voltage of the vibration power generation element 11 becomes maximum. The peak detection unit 13a detects the time when the output voltage of the vibration power generation element 11 becomes maximum as a first peak-value time. As shown in FIG. 3, when, with the tire 3 further rotating, the portion of the tread 31 corresponding to the location where the vibration power generation element 11 is disposed exits the ground contacting state, the output voltage of the vibration power generation element 11 becomes minimum. The peak detection unit 13a detects the time when the output voltage of the vibration power generation element 11 becomes minimum as a second peak-value time.

The reason why the output voltage of the vibration power generation element 11 shows peak values at the timing described above is as follows. When, with the tire 3 rotating, the portion of the tread 31 corresponding to the location where the vibration power generation element 11 is disposed starts contact with the ground, the portion of the tire 3 near the vibration power generation element 11 is, by being pressed, deformed. As a result, the surface of the portion changes from an approximately cylindrically curved surface into a flat surface. The impact the vibration power generation element 11 is subjected to at this time causes the vibration power generation element 11 to output the voltage of the first peak-value. Also, when, with the tire 3 further rotating, the portion of the tread 31 corresponding to the location where the vibration power generation element 11 is disposed comes off the ground, the portion of the tire 3 near the vibration power generation element 11 exits, by being released from the pressure, the flat-surfaced state and restores an approximately cylindrically curved surface. The impact the vibration power generation element 11 is subjected to at this time causes the vibration power generation element 11 to output the voltage of the second peak-value. Thus, the vibration power generation element 11 outputs the first peak-value voltage and the second peak-value voltage when the ground contact is started and when the ground contact is ended, respectively. Since the directions of the impacts generated when the tire 3 is pressed and when the tire 3 is released from the pressure are opposite to each other, the voltages outputted when the tire 3 is pressed and when the tire 3 is released from the pressure are to be represented by mutually opposite signs.

The peak detection unit 13a extracts detection signal data including information about the first peak-value time and the second peak-value time and sends the extracted data to the ground contact time calculation unit 13b. The detection signal data including information about the first peak-value time and the second peak-value time refers to the detection signal itself detected over a predetermined period including the period from the first peak-value time to the second peak-value time. The predetermined period including the period from the first peak-value time to the second peak-value time may be a period corresponding to a turn of the tire. The period corresponding to a turn of the tire is assumed to be a period during which detection signal data covering at least a turn of the tire can be collected with the vehicle traveling at a speed desired for determining an overloaded state of the tire 3, for example, a speed in the range of 40 to 120 km/h. When the speed range is assumed to be 40 to 120 km/h, a period (e.g. 250 ms) during which the tire makes at least a turn with the vehicle traveling at a minim speed of 40 km/h is applied as the predetermined period. Alternatively, the predetermined period may be a period between two successive first peak-value times. Though, in the present embodiment, the peak detection unit 13a extracts detection signal data including information about the first peak-value time and the second peak-value time and sends the extracted data to the ground contact time calculation unit 13b, the peak detection unit 13a may alternatively send only the data about the first peak-value time and the second peak-value time to the ground contact time calculation unit 13b.

Similarly, when the first peak value and the second peak value are obtained, the peak detection unit 13a determines the period between the first peak-value time and the second peak-value time as a ground contact duration of the vibration power generation element 11 and informs the high-frequency level calculation unit 13c that the vibration power generation element 11 is in a ground contact duration. Like for the ground contact time calculation unit 13b, the peak detection unit 13a may extract detection signal data including information about the first peak-value time and the second peak-value time and send the extracted data to the high-frequency level calculation unit 13c or may alternatively send the data about the first peak-value time and the second peak-value time to the high-frequency level calculation unit 13c.

The time when the output voltage of the vibration power generation element 11 becomes a second peak value is when the ground contact of the vibration power generation element 11 ends, so that, at that time, the peak detection unit 13a sends a transmission trigger to the transmitter 14. This causes the transmitter 14 to transmit such data as ground contact length data generated at the ground contact time calculation unit 13b and μ data generated at the high-frequency level calculation unit 13c as being described later. In this way, without being continuously engaged in data transmission, the transmitter 14 transmits data only when the ground contact of the vibration power generation element 11 ends, so that power consumption is reduced.

Based on the data received from the peak detection unit 13a, the ground contact time calculation unit 13b calculates the ground contact time of the vibration power generation element 11. Since the calculated ground contact time is indicative of a ground contact length of the tire, the ground contact time calculation unit 13b communicates the calculated ground contact time to the transmitter 14 as ground contact length data. To be specific, the ground contact time calculation unit 13b calculates, based on the data received from the peak detection unit 13a, the period between the first peak-value time and the second peak-value time. The ground contact time calculation unit 13b calculates the ground contact time of the vibration power generation element 11. When the data received from the peak detection unit 13a includes sets of first peak values and second peak values, the ground contact time calculation unit 13b calculates, for example, the period between the time of the maximum one of the first peak values and the time of the directly following second peak value. Alternatively, also when the data received from the peak detection unit 13a includes sets of first peak values and second peak values, the period between the time of the minimum one of the second peak values and the time of the directly preceding first peak value may be calculated.

When a detection signal of a period corresponding to at least a turn of the tire with the vehicle traveling in the foregoing speed range (40 to 120 km/h) is received, the maximum value included in the detection signal is detected as a first peak value. Also, the minimum value included in a detection signal of a certain period extending from immediately after the time of the maximum value is detected as a second peak value. The certain period is, for example, shorter than a period corresponding to a turn of the tire at a vehicle travel speed of 120 km/h and longer than a ground contact time estimated for a vehicle travel speed of 40 km/h (e.g. 30 ms). The difference between the time of the first peak value and the time of the second peak value can be determined to be a ground contact time.

When informed by the peak detection unit 13a that the vibration power generation element 11 is in a ground contact duration, the high-frequency level calculation unit 13c calculates the level of the high frequency components, attributable to the vibration of the tire 3, of the voltage outputted by the vibration power generation element 11 during the ground contact duration. The high-frequency level calculation unit 13c sends the calculation result to the transmitter 14 as μ data. In the present embodiment, the level of the high-frequency components is calculated as an indicator of friction coefficient μ. The reason why will be described with reference to FIGS. 4A, 4B and 5.

Figure 4A:
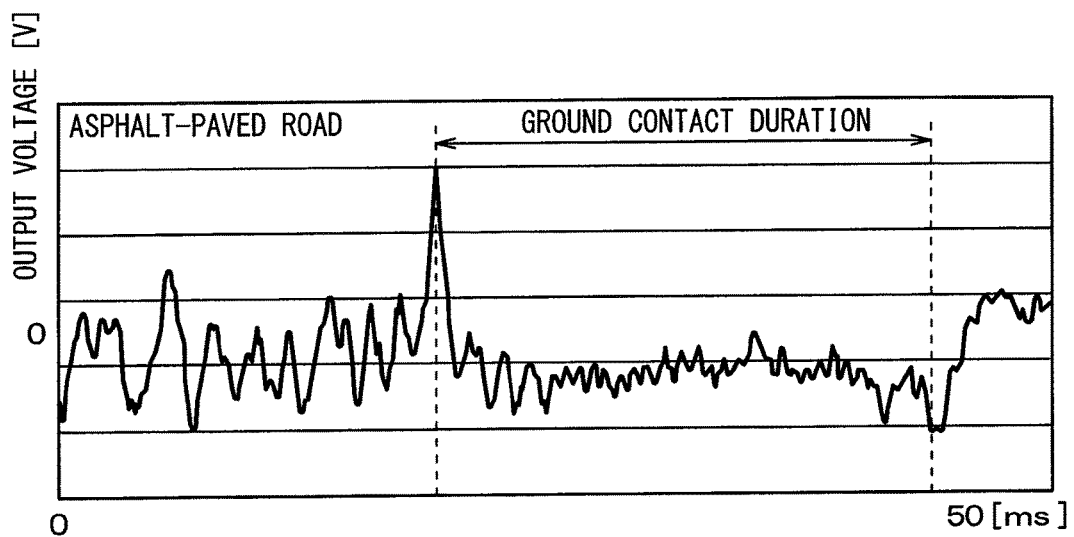
FIG. 4A is a diagram illustrating output voltage variation of the vibration power generation element in a case where the friction coefficient (hereinafter referred to as "$\mu$") is relatively high like when traveling on a high-$\mu$ road surface, for example, an asphalt-paved road.
Figure 4B:
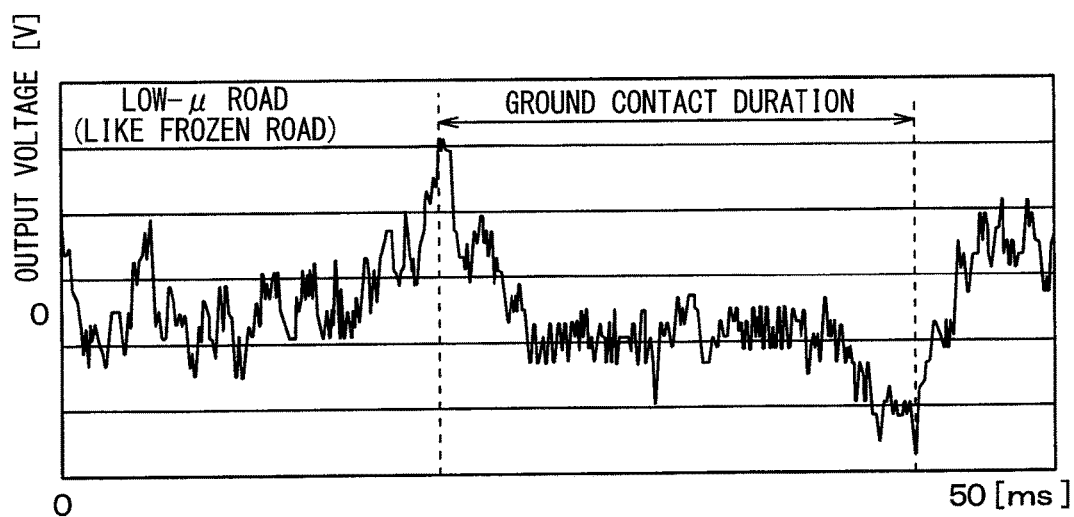
FIG. 4B is a diagram illustrating output voltage variation of the vibration power generation element during traveling on a low-$\mu$ road surface with a relatively low road surface $\mu$ like a frozen road.

FIG. 4A represents output voltage variation of the vibration power generation element 11 in a case where the friction coefficient μ between the tire 3 and the road surface is high with the vehicle traveling on a high-μ road surface, for example, an asphalt-paved road surface with a relatively high road surface μ. FIG. 4B represents output voltage variation of the vibration power generation element 11 in a case where the friction coefficient μ between the tire 3 and the road surface is low with the vehicle traveling on a low-μ road surface, for example, a frozen road surface with a relatively low road surface μ.

As known from these drawings, regardless of the road surface μ, a first peak value and a second peak value appear at the beginning and at the end of a ground contact duration, respectively, i.e., when the vibration power generation element 11 starts and ends contact with the ground, respectively. The output voltage of the vibration power generation element 11 varies by being affected by the friction coefficient μ between the tire 3 and the road surface. For example, when the friction coefficient μ is low like when traveling on a low-μ road surface, fine high-frequency vibrations caused by slipping of the tire 3 are superimposed on the output voltage of the vibration power generation element 11. When the friction coefficient μ is high like when traveling on a high-μ road surface, the degree of superimposition of fine high-frequency signals generated by slipping of the tire 3 is low.

Figure 5:
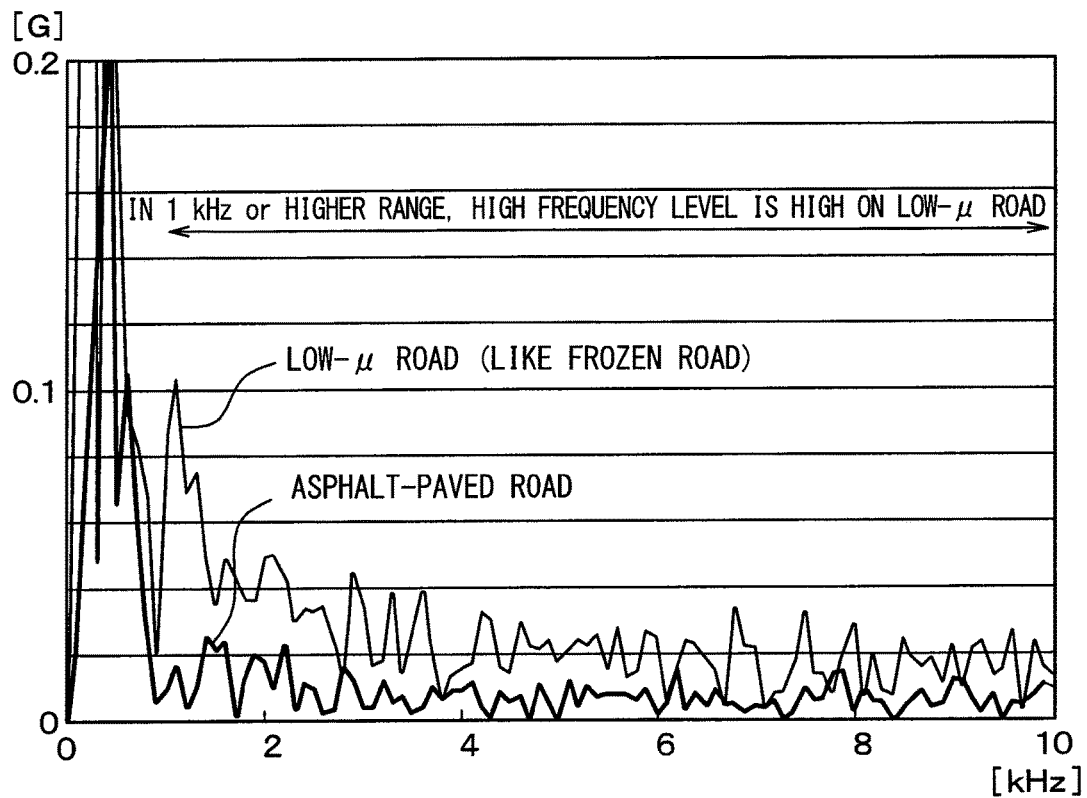
FIG. 5 is a diagram illustrating results of frequency analysis made on the output voltage during a ground contact duration when traveling on a high-$\mu$ road surface and also when traveling on a low-$\mu$ road surface.

FIG. 5 illustrates results of frequency analysis made, for both cases where the frequency coefficient μ is high and where the frequency coefficient μ is low, on the output voltage during a ground contact duration. As shown, the high frequency component level is high in a low frequency range whether the vehicle is traveling with a high friction coefficient μ or with a low friction coefficient μ. However, in a high-frequency range of 1 kHz or higher, the high frequency component level is higher when the friction coefficient μ is low than when the friction coefficient μ is high. Thus, the high frequency component level of the output voltage of the vibration power generation element 11 is indicative of the road surface condition.

Hence, the high frequency component level of the output voltage during a ground contact duration of the vibration power generation element 11 calculated by the high frequency level calculation unit 13c can be used as μ data.

For example, the high frequency component level can be calculated by extracting the high frequency components of the output voltage of the vibration power generation element and integrating the high frequency components extracted during a ground contact duration. To be specific, high frequency components in frequency bands fa to fb assumed to vary according to the road surface condition and road surface μ are extracted, for example, by filtering and the voltage of high frequency components in the frequency bands fa to fb collected by frequency analysis is integrated. For example, the voltage is charged in a capacitor, not shown. In this way, the amount charged is larger when the friction coefficient μ is high like when traveling on a high-μ road surface than when the friction coefficient μ is low like when traveling on a low-μ road surface. By using the charged amount as μ data, the friction coefficient μ can be estimated such that the road surface μ is lower when the charged amount represented by the μ data is larger.

The transmitter 14 transmits the ground contact length data and μ data received from the ground contact time calculation unit 13b and the high frequency level calculation unit 13c to the vehicle-side device 2. Communication between the transmitter 14 and a receiver 21 included in the vehicle-side device 2 can be realized using publicly known near-field communication technology, for example, Bluetooth (registered trademark). Though the timing of data transmission is optional, in the present embodiment, a transmission trigger sent from the peak detection unit 13a when the vibration power generation element 11 ends contact with the ground causes the transmitter 14 to transmit data as described above. Namely, the transmitter 14 transmits data not constantly but only when the vibration power generation element 11 ends contact with the ground, so that power consumption is reduced.

Each item of data is transmitted together with unique identification information (hereinafter referred to as "ID information") of the tire wheel mounted on the vehicle corresponding to each tire 3. The position of each tire wheel of the vehicle can be identified using a well-known tire wheel position detection device, so that, when each item of data accompanied by the corresponding ID information is transmitted to the vehicle-side device 2, the corresponding tire wheel can be identified.

The vehicle-side device 2 receives the ground contact length data and μ data transmitted from the tire-side device 1 and, by performing various types of processing based on the received data, performs various types of control using, for example, an ACC system and a collision mitigation brake system. To be specific, the vehicle-side device 2 is configured including the receiver 21 and a travel control unit 22.

The receiver 21 is a device to receive the ground contact length data and μ data transmitted from the tire-side device 1. Every time data is received, the receiver 21 sequentially transmits the received data to the travel control unit 22.

The travel control unit 22 is configured with a well-known microcomputer having a CPU, a ROM, a RAM and an I/O and performs various types of control in accordance with programs stored, for example, in the ROM using, for example, an ACC system and a collision mitigation brake system. In the present disclosure, the travel control unit 22 is illustrated as a unit to commonly control both the ACC system and the collision mitigation brake system, but the unit may be divided into separate units to control the ACC system and the collision mitigation brake system, respectively. To be specific, the travel control unit 22 includes a vehicle speed acquisition unit 22a, a calculation unit 22b, a friction coefficient estimation unit 22c, a ground contact load calculation unit 22d, a braking distance estimation unit 22e, an acceleration deceleration command unit 22f, and an acceleration deceleration control unit 22g.

The vehicle speed acquisition unit 22a acquires vehicle speed data calculated by an on-board ECU (electronic control unit) based on, for example, signals detected by a vehicle speed sensor and a tire wheel speed sensor via an on-board network CAN (controller area network).

The calculation unit 22b calculates the distance from a preceding vehicle, the speed difference relative to the preceding vehicle, and also the time to collision (hereinafter referred to as "TTC") that is the time taken before colliding with the preceding vehicle. The methods of calculating an inter-vehicle distance, a relative speed difference, and the TTC are well-known and will not be specifically described herein. The distance from a preceding vehicle and the speed difference relative to the preceding vehicle are calculated, for example, using a lidar, and the TTC is calculated based on the calculated inter-vehicle distance and the relative speed difference.

The friction coefficient estimation unit 22c estimates the frequency coefficient μ based on the high-frequency-level integrated voltage value represented by the μ data. It may be an absolute value of the friction coefficient μ that is estimated or only whether the friction coefficient μ is high or low may be estimated. For example, it may be estimated that the friction coefficient μ is lower when the integrated voltage value represented by the μ data is larger. Or, a determination threshold may be set for comparison with the integrated voltage value. It is then possible to determine that, when the integrated voltage value is larger than the threshold, the friction coefficient μ is low and that, when the integrated voltage value is smaller than the threshold, the friction coefficient μ is high.

The ground contact load calculation unit 22d calculates the ground contact load of the tire 3 based on the ground contact length data. To be specific, based on ground contact time data received from the tire-side device 1 and vehicle speed data acquired by the vehicle speed acquisition unit 22a, the ground contact load calculation unit 22d calculates the ground contact length of the tire 3 by multiplying the vehicle speed and the ground contact time. For example, when the vehicle speed is 60 km/h and the ground contact time is 6 msec, the ground contact length is calculated to be 10 cm by multiplying the 60 km/h and 6 msec. Then, since the ground contact loads corresponding to ground contact lengths of the tire 3 are predetermined, the ground contact load corresponding to the calculated ground contact length can be determined.

Figure 6:
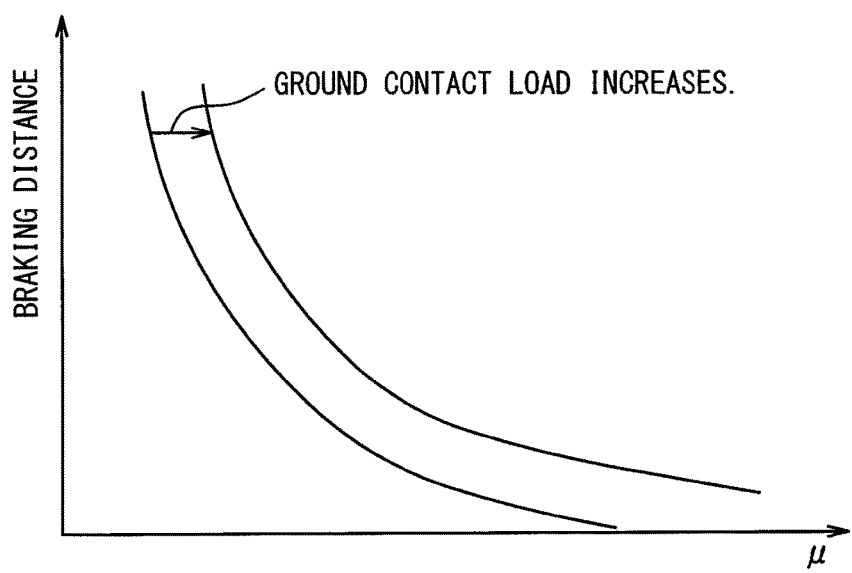
FIG. 6 is a diagram illustrating relationships between frequency coefficient μ, ground contact load and braking distance.

The braking distance estimation unit 22e acquires a braking distance based on the friction coefficient μ and the ground contact load calculated as described above. The braking distance depends basically on the friction coefficient μ and the relative speed difference and is longer when the ground contact load of the tire wheel is larger. For example, based on a predetermined relative speed difference, the friction coefficient μ and the braking distance are related as shown in FIG. 6, i.e. the braking distance is shorter when the friction coefficient μ is larger. When the ground contact load is larger, the above relationship is shifted to cause the braking distance to be longer. For each of different relative speed differences, the braking distance estimation unit 22e stores a map representing the relationship as shown in FIG. 6 or a function expression representing such relationship. Using such a map or function expression, the braking distance estimation unit 22e acquires the braking distance corresponding to the friction coefficient μ and the ground contact load calculated as described above. When the braking distance is estimated as described above, the braking distance estimation unit 22e sends the estimation result to the acceleration deceleration command unit 22f. Equation 1 is an example of function expression representing the relationship shown in FIG. 6. In equation 1, L represents a braking distance, V represents a relative speed difference, and μ represents a friction coefficient. Also, k represents a coefficient set according to the ground contact load.

$$L = l(V^2/\mu) \quad \text{(Equation 1)}$$

The acceleration deceleration command unit 22f issues commands related with acceleration deceleration control in the ACC system and the collision mitigation brake system based on the estimated braking distance communicated from the braking distance estimation unit 22e and the inter-vehicle distance and TTC calculated by the calculation unit 22b. For example, when the inter-vehicle distance becomes equal to or shorter than the braking distance, the acceleration deceleration command unit 22f issues a deceleration command so as to avoid a collision with the preceding vehicle. Also, when the inter-vehicle distance is longer than the braking distance and the possibility of a collision with the preceding vehicle is small, the acceleration deceleration command unit 22f issues an acceleration order.

The acceleration deceleration control unit 22g performs various control to accelerate/decelerate the vehicle based on commands received from the acceleration deceleration command unit 22f. The acceleration deceleration control unit 22g is configured, for example, with an engine ECU and a brake ECU. According to commands from the acceleration deceleration command unit 22f, the engine ECU performs engine control to achieve acceleration and the brake ECU performs brake control to achieve braking. To be specific, when an acceleration order is issued, the engine ECU increases the accelerator opening and thereby achieves acceleration as ordered. When a deceleration order is issued, the brake ECU drives a motor included in a brake actuator, thereby, causing a pump to operate and also controls various electromagnetic valves to generate a braking force to achieve braking as ordered.

The above units included in the travel control unit 22 are configured to be capable of mutually exchanging information, for example, via a CAN (Controller Area Network) which is an on-board network.

As described above, in the vehicle control device 100 according to the present embodiment, the friction coefficient μ between the tire 3 and the road surface is communicated from the tire-side device 1 to the vehicle-side device 2 and, based on the friction coefficient μ, vehicle acceleration deceleration control is performed in the ACC system and the collision mitigation brake system. To be specific, a braking distance is estimated based on the friction coefficient μ and, based on the braking distance, vehicle acceleration deceleration control is performed. It is, therefore, possible to time acceleration deceleration according to the braking distance estimated based on the friction coefficient μ. This enables more appropriate vehicle acceleration deceleration control. Particularly, by taking the ground contact load against each tire wheel into account in estimating a braking distance, a braking distance better reflecting the vehicle condition can be estimated.

For example, in cases where the road surface μ is low and, therefore, the friction coefficient μ between the tire 3 and the road surface is low compared with when the road surface μ is high, the braking distance increases. In such cases, the inter-vehicle distance reduces to or to be shorter than the braking distance relatively early, so that required deceleration can be achieved earlier. This allows the ACC system and the collision mitigation brake system to maintain an appropriate inter-vehicle distance according to the friction coefficient μ, so that vehicle acceleration deceleration can be controlled more appropriately based on variation of the friction coefficient μ.

Figure 7:
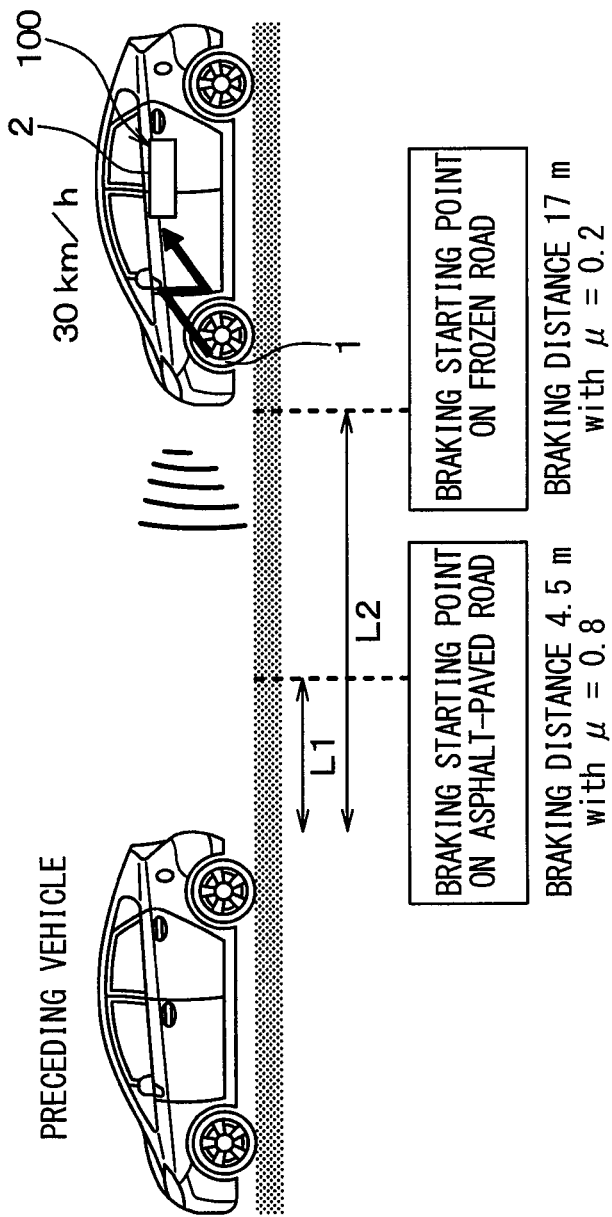
FIG. 7 is a diagram illustrating a relationship between the distance between a subject vehicle and a preceding vehicle and the braking starting point based on the friction coefficient μ.

To be specific, as shown in FIG. 7, assume that a vehicle is traveling following a preceding vehicle at 30 km/h on an asphalt-paved road and that the road surface μ is, for example, 0.8. In such a case, the friction coefficient μ between the tire 3 and the road surface is high and the braking distance is estimated to be 4.5 m. Even under the same conditions, if the vehicle is traveling on a frozen road surface, the road surface μ is, for example, 0.2. In this case, the friction coefficient μ between the tire 3 and the road surface is low and the braking distance is estimated to be 17 m. As shown in FIG. 7, when the friction coefficient μ is low, deceleration is started when the inter-vehicle distance is L2 that is longer than the inter-vehicle distance L1 at which deceleration is to be started when the friction coefficient μ is high.

In the collision mitigation brake system, control to warn the vehicle driver before issuing an order for deceleration is also performed For this control, an inter-vehicle distance longer than the inter-vehicle distance for starting deceleration is used as a threshold. The inter-vehicle distance to be set as a threshold to determine when to warn the driver can also be varied according to the friction coefficient μ. This makes it possible, when the friction coefficient μ is low, to warn the driver early for safer traveling.

The friction coefficient μ applied in the present embodiment represents not only the road surface μ but also the friction coefficient between the tire 3 and the road surface, i.e. grip force. Namely, the friction coefficient μ is a value taking into account variation of the road surface μ and also wear of the tire. Therefore, even under conditions where the braking distance tends to increase, for example, when the road surface μ is low or when the ground contact load of each tire wheel is excessively large, a safer inter-vehicle distance can be maintained for enhanced traveling safety.

Other Embodiments

The above embodiment does not limit embodiments and can be appropriately modified.

For example, in the above embodiment, in addition to μ data, ground contact length data is sent from the tire-side device 1 to the vehicle-side device 2 and a braking distance is estimated taking into account, in addition to the friction coefficient μ between the tire 3 and the road surface calculated based on the μ data, the ground contact load of each tire wheel calculated based on the ground contact length data. In this way, a more accurate braking distance with the ground contact load taken into account can be estimated, but a braking distance may be estimated at least based on the friction coefficient μ between the tire 3 and the road surface calculated based on the μ data.

What is claimed is:
1. A vehicle control device comprising:
  a tire-side device including
    a vibration detection unit attached to a back side of a tread of a tire fitted to a tire wheel mounted on a vehicle that outputs a detection signal corresponding to a magnitude of a vibration of the tire in a tangential direction to a rotation direction of the tire and that generates electrical power from the vibration of the tire,
    a signal processing unit that generates μ data by processing the detection signal outputted from the vibration detection unit, the μ data representing a friction coefficient between the tire and a road surface,
    a transmitter that transmits the μ data, and
    a power supply circuit that receives and stores the electrical power generated by the vibration detection unit and that supplies electrical power to the signal processing unit and the transmitter; and
  a vehicle-side device including
    a receiver that receives the μ data transmitted from the transmitter and
    a travel control unit including
      a friction coefficient estimation unit that estimates the friction coefficient based on the μ data,
      a braking distance estimation unit that acquires a braking distance of the vehicle based on the friction coefficient, and
      an acceleration deceleration control unit that controls acceleration and deceleration of the vehicle based on the braking distance.
2. The vehicle control device according to claim 1, wherein
  the travel control unit further includes:
    a calculation unit that calculates an inter-vehicle distance between the vehicle and a preceding vehicle; and
    an acceleration deceleration command unit that commands deceleration of the vehicle when the inter-vehicle distance becomes equal to or shorter than the braking distance.

3. The vehicle control device according to claim 1, wherein:

based on the detection signal outputted from the vibration detection unit, the signal processing unit of the tire-side device outputs ground contact length data and transmits the ground contact length data transmitted via the transmitter, the ground contact length data being data about a ground contact length between the tire and the road surface;

the vehicle-side device further includes
- a vehicle speed acquisition unit that acquires a vehicle speed of the vehicle and
- a ground contact load calculation unit that calculates the ground contact length based on the vehicle speed and the ground contact length data and that calculates a ground contact load based on the ground contact length; and the braking distance estimation unit estimates the braking distance based on the friction coefficient and the ground contact load.

* * * * *